'United States Patent Office 3,764,452
Patented Oct. 9, 1973

3,764,452
GLASS FIBER-REINFORCED ELASTOMERS
Alfred Marzochi, Cumberland, R.I., assignor to Owens-Corning Fiberglas Corporation
Filed Dec. 13, 1971, Ser. No. 209,878
Int. Cl. B29h 17/28; B32b 25/02; D02g 3/00
U.S. Cl. 161—140
26 Claims

ABSTRACT OF THE DISCLOSURE

The improvement in the bonding relationship between glass fibers and elastomeric materials in the manufacture of glass fiber-reinforced elastomeric products wherein bundles of glass fibers are first coated with an elastomer compatible material and then are coated with a cellulose xanthate which prevents the elastomer compatible material from being dislodged from the glass fiber surfaces, which can either be removed or chemically modified to aid in the integration of the glass fiber bundle with the elastomeric material with which it is combined.

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting cushing and to yarns that are formed when such discontinuous fibers are allowed to rain down gravitational onto a foraminous surface wherein the fibers are gathered onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is intended to mean and include natural rubber in the cured or uncured stage, vulcanized or unvulcanized stage, and synthetic organic elastomeric materials such as styrene, nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitriles copolymer, butadiene-styrene-vinyl pyridine terpolymer, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is frequently the practice in the manufacture of glass fiber-reinforced elastomeric products to impregnate bundles formed of a plurality of glass fibers to establish a more secure bonding relationship between the glass fiber bundles and the elastomeric material with which the glass fibers are combined. It is believed that the impregnant in the bundle serves to intertie the glass fiber surfaces to the elastomeric material.

The bundles of glass fibers can be in the form of a strand of individual glass fibers which have been gathered together after forming, but preferably take the form of two or more strands of glass fibers which have been twisted and/or plied together to form a cord.

Impregnation of such bundles of glass fibers is most frequently effected by immersion of the bundle in a bath containing the impregnating composition, and, while the bundle is still immersed in the bath, the bundle is subjected to one or more sharp changes in direction to thereby open the bundle to enable the impregnating composition to penetrate the bundle and completely fill the interstices between the individual glass fiber filaments forming the bundle.

Thereafter, the impregnated bundle may, although not necessarily, be subjected to further processing steps, such as weaving to form woven fabrics or processing to form non-woven fabrics, prior to combination with elastomeric material in the manufacture of glass fiber-reinforced elastomeric materials. Regardless of whether the impregnated bundles of fibers are subjected to further processing, they are nevertheless frequently subjected to various handling steps such as winding on a spool or the like, with the results that the impregnant in the glass fiber bundle frequently tends to become dislodged from the bundle.

It has been suggested that the impregnant in the bundle can be physically held in the glass fiber bundle by coating the impregnated bundle with a material which acts as a protective sheath for the bundle. However, such sheathing material often serves to weaken the bond established between the bundle and the elastomeric material with which the bundle is combined, unless the sheathing material is removed. However, removal of such sheathing material without adverse effects on the underlying impregnant can present considerable difficulties.

It is accordingly an object of the present invention to provide a method for treatment of impregnated glass fiber bundles to provide a protective coating to retain the impregnant in the bundle during processing but which can either be removed prior to combination of the bundle with elastomeric materials or chemically modified to enable the treated bundle to be combined with elastomeric materials without removal of the protective coating.

It is a related object of the invention to provide bundles of glass fibers treated in accordance with the invention and elastomeric products reinforced with bundles treated in accordance with the invention.

These and other objects and advantages of the invention will appear more fully hereinafter, and, for purposes of illustration and not of limitation, an embodiment of the invention is shown in the accompanying drawing in which.

Figure 1:
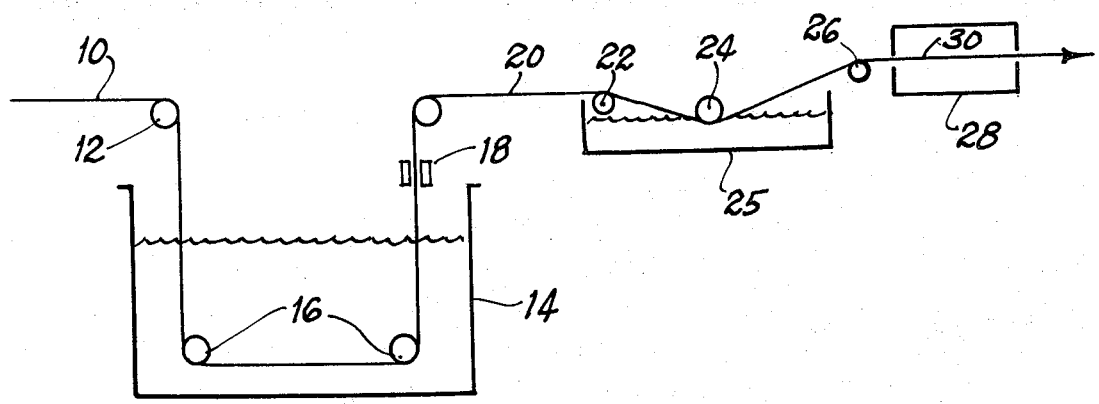
FIG. 1 is a flow diagram illustrating the treatment of glass fiber bundles with an impregnant and then with a protective sheathing material in accordance with the practice of the present invention.

The concepts of the present invention reside in the treatment of glass fiber bundles which have been impregnated with an alkaline impregnant containing an elastomer component with a cellulose xanthate to form a protective coating on the impregnated bundles to prevent the impregnant in the bundles from being dislodged during subsequent handling and for processing of the bundles. The treated bundles can then be further treated, prior to combination of the bundles with an elastomeric material, to either remove the protective coating without adversely affecting the impregnant, or the protective coating can be chemically modified whereby the modified coating serves to enhance the integration of the bundle with an elastomeric material without removal.

The cellulose xanthates preferred for use in the practice of the invention are the xanthates having the formula

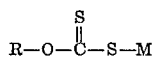

wherein R is the cellulose group and M represents a monovalent metal, and preferably an alkali metal (e.g., sodium, potassium, lithium, etc.).

The cellulose xanthate can be applied by immersion of the impregnated bundle in an aqueous dispersion of the xanthate. The amount of the xanthate deposited on the impregnated bundle can be conveniently controlled as desired by regulating the concentration of the xanthate in the dispersion. It is generally preferred that the cellulose xanthate constitute between 5 to 30% by weight of the coated bundle. For this purpose, the xanthate content of the coating solution should be maintained within the range of 10 to 50% by weight on a solids basis.

In accordance with one embodiment of the invention, the cellulose xanthate coating can be simply and completely removed by simply passing the bundle through an alkaline bath whereby the xanthate coating is dissolved away from the bundle. Since the impregnant is an alkaline material, the alkaline bath used to remove the protective xanthate coating has no substantial effect on the impregnant in the bundle.

As the alkaline bath, use can be made of a solution of any organic or inorganic base having an alkaline pH. For reasons of economy, it is generally preferred to make use of an aqueous solution of a quaternary ammonium hydroxide or an alkali metal hydroxide (e.g., NaOH or KOH). However, a variety of other bases can be used in concentrations sufficient to provide an aqueous solution with a pH above 8.5, and preferably above 9.

After removal of the xanthate protective coating, the bundles can then be combined with elastomeric materials to form glass fiber-reinforced elastomeric products in a conventional manner.

In accordance with another embodiment of the invention, the glass fiber bundle which has been provided with a protective cellulose xanthate coating can be directly combined with elastomeric materials in the manufacture of glass fiber-reinforced elastomeric products whereby the xanthate serves as a source of sulfur vulcanizing agent, or the bundle subjected to further treatment to chemically modify the cellulose xanthate coating to a coating which is capable of enhancing the bonding relationship between the alkaline impregnant and the elastomer constituting the continuous phase of a glass fiber-reinforced elastomeric product.

In the preferred practice of the invention, the coated glass fiber bundle is treated with an organic halide to convert the xanthate to the corresponding derivative in accordance with the reaction

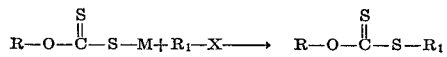

For this purpose, the $R_1$ group should be an organic group which serves to enhance the bonding relationship between the impregnated bundle and the elastomer constituting the continuous phase.

For example, $R_1$ can be an acyl group, and preferably an acyl group containing ethylenic unsaturation such as a group of the formula

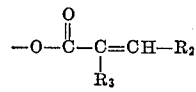

wherein $R_2$ is hydrogen or lower alkyl (e.g., methyl, ethyl, isopropyl, etc.) and $R_3$ is hydrogen or methyl. As will be appreciated by those skilled in the art, $R_1$ can be a number of other acyl groups including benzoyl, alkanoyl groups, etc.

Representative of acid halides which can be used include acryloyl chloride, methacryloyl chloride, benzoyl chloride, acetyl chloride, etc.

Without limiting this embodiment of the invention as to theory, it is believed that the cellulose xanthate derivative which has the formula

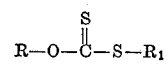

serves as a source of a sulfur vulcanizing agent in the area of the interface between the bundle and the continuous phase of an elastomeric material when the bundle is combined wtih the elastomeric material and cured and/or vulcanized under heat and pressure. In addition, when the $R_1$ group contains ethylenic unsaturation, the $R_1$ group competes with the unsaturated groups of the vulcanizable elastomer for vulcanizing agent to aid in the integration of the treated glass fiber bundle with the elastomer forming the continuous phase.

In accordance with yet another embodiment of the invention, the impregnated bundle which has been provided with a protective coating of the cellulose xanthate can be treated with an acid to convert the cellulose xanthate coating to a cellulose coating. The resulting cellulose fiber bundle can then be directly combined with an elastomeric material in the manufacture of glass fiber-reinforced elastomeric products.

Since the impregnant in the glass fiber bundle need only be an alkaline material containing an elastomer component so that it will be unaffected by a base if it is desired to remove the xanthate coating prior to incorporation of the bundle with elastomeric materials, the impregnant can be any of a variety of alkaline polymeric materials used in the treatment of glass fiber bundles. Frequently preferred are combinations of an elastomer, and preferably natural rubber, with a resorcinol-aldehyde resin as described in my copending application Ser. No. 398,305, filed Sept. 22, 1964, now abandoned. In addition, use can be made of vinyl pyridine-butadiene-styrene terpolymer latices, as well as combinations of such terpolymers with a resorcinol-aldehyde resin and a polybutadiene latex as described in U.S. Pat. No. 3,424,608.

The amount of impregnant present in the glass fiber bundle is not critical and can be varied within wide ranges. The amount of impregnant should be such that the impregnant fully penetrates the glass fiber bundle and separates the fibers each from the other. It is generally preferred that the impregnant constitute between 5 and 30% by weight of impregnated fiber system.

Having described the basic concepts of the present invention, reference is now made to the following examples, which are provided by way of illustration, and not by way of limitation, of the practice of the present invention in the treatment of impregnated bundles of glass fibers to form a protective xanthate coating and the subsequent processing of treated bundles in the manufacture of glass fiber-elastomeric products.

EXAMPLE 1

A glass fiber bundle in which the individual glass fibers have preferably, but not necessarily, been sized in forming are first impregnated with a combination of natural rubber and a resorcinol-formaldehyde resin the following impregnating composition

|  | Percent by wt. |
|---|---|
| Natural rubber latex-resorcinol-formaldehyde resin (38% solids-"Lotol") | 35.0 |
| Water | 65.0 |

Impregnation with the above aqueous composition can be achieved by conventional means for impregnation. Referring now specifically to FIG. 1 of the drawing, a glass fiber bundle 10 is advanced over a guide roller 12 for passage downwardly into a bath 14 containing the impregnating composition. The bundle is then turned under a pair of rollers 16 to effect a sharp bend which operates to open the bundle to enable complete penetration of the aqueous impregnating composition into the bundle for impregnation of the bundle. The impregnated bundle is then raised from the bath for passage through a roller or die 18 which serves to remove excess impregnating composition from the bundle and to work the impregnating composition into the bundle.

Thereafter, the endless bundle 20 which has been impregnated with the alkaline impregnant can then be processed in accordance with the present invention by passage over a guide roller 22 and under roller 24 into a bath 25 formulated as follows:

|  | Percent by wt. |
|---|---|
| Sodium cellulose xanthate | 20 |
| Water | 80 |

As the bundle is advanced through bath 25, it is preferably subjected to little flexure to insure that the cellulose xanthate form a coating on the surface of the bundle. After passage through the bath 25, the bundle 30 is then advanced over a guide roller 26 and through a drying oven 28 preferably in the form of an air drying oven which serves to accelerate removal of the aqueous diluent. As will be appreciated by those skilled in the art, drying can be effected at ambient temperatures but is preferably conducted at elevated temperatures, such as temperature from 100° to 350° F.

Figure 2:
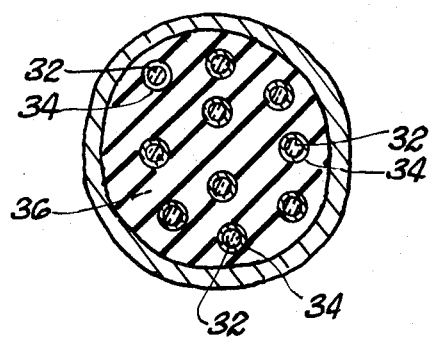
FIG. 2 is a cross sectional view of the glass fiber bundle treated in accordance with the method illustrated in FIG. 1.

The resulting bundle 30 is shown in cross section in FIG. 2 of the drawing. As can be seen from this figure, the bundle is formed of a plurality of glass fibers 32 which may, though not necessarily, have a size coating 34 on the surfaces thereof. The impregnant 36 in the form of the resorcinol formaldehyde latex as exemplified in this example completely penetrates the bundle and serves to separate the fibers each from the other. The celluolse xanthate forms a thin coating 38 overlying the impregnant 36 and thus serves as a protective coating for the bundle to retain the impregnant in the bundle during subsequent processing or handling.

As indicated above, the impregnant of Example 1 is a resorcinol formaldehyde latex. Suitable resorcinol formaldehyde resins and combinations thereof with natural rubber latex are marketed by U.S. Rubber Company under the trade name "Lotol." In the preparation of such materials, reference can be made to Canadian Pat. No. 435,754 wherein description is made of the reaction of resorcinol and formaldehyde in the presence of substantial amounts of short chained alkyl amines for the purposes of stabilizing the reaction and the products formed therefrom, as well as a description of the combination of the formed resin with rubber latex.

As will be appreciated by those skilled in the art, the impregnating composition can be modified to include one or more of the now well known glass fiber anchoring agents to further improve the bond established between the glass fiber surfaces and the impregnant. For this purpose, use can be made of various organo silanes such as gamma-aminopropyltriethoxysilane or Werner complex compounds such as stearato chromic chloride.

The amounts of such anchoring agents is not critical, and can be varied within wide ranges. It is generally sufficient that the anchoring agent constitute from 0.1 to 5% by weight based upon the dry solids of the impregnant. When use is made of such anchoring agents, it is frequently advantageous to formulate the impregnating composition to include a quaternary ammonium compound to promote the stability of the system.

Other alkaline impregnates containing elastomer components can also be used, as represented by the following example.

EXAMPLE 2

Using the procedure described in Example 1, a glass fiber bundle is impregnated with the following composition:

|  | Percent by wt. |
|---|---|
| Vinyl pyridine-butadiene-styrene terpolymer latex | 30 |
| Water | 70 |

The vinyl pyridine-butadiene-styrene terpolymer latex is formed of 15% by weight vinyl pyridine, 70% by weight butadiene and 15% by weight styrene. After impregnation, the bundle is then coated with the following composition:

|  | Percent by wt. |
|---|---|
| Potassium cellulose xanthate | 15 |
| Water | 85 | to form a protective coating on the bundle.

EXAMPLE 3

Glass fiber bundles which are processed in accordance with Example 1 are first woven into a fabric in a conventional manner. It is found that the xanthate coating serves to prevent the impregnant from being dislodged during the weaving operation. Thereafter, the fabric is immersed in an aqueous solution of 0.1 N NaOH for a time sufficient to remove all of the xanthate coating.

The fabric is then laid down with layers of natural rubber to form a glass fiber-rubber matrix which can then be molded under heat and pressure in a conventional manner to advance the natural rubber to a cured or vulcanized state. It is believed that the tie-in between the impregnated bundle and the elastomer constituting the continuous phase occurs primarily during the cure and/or vulcanization to integrate the bundles in the elastomeric material.

EXAMPLE 4

Glass fibers treated in accordance with Example 1 are immersed in a solution of acryloyl chloride in an inert solvent at room temperature, and allowed to remain in the solution for about 3 minutes to convert the cellulose xanthate to the corresponding acryloyl derivative

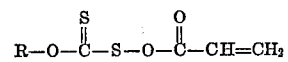

After removal from the acryloyl chloride, the treated bundle is dried, and combined with natural rubber as described in Example 3. It is found that, after heat and pressure are applied to the elastomer-glass fiber bundle composite during molding, the glass fiber bundle is securely integrated with the natural rubber constituting the continuous phase.

EXAMPLE 5

Glass fiber bundles treated in accordance with Example 1 are combined directly with neoprene rubber by laying down the bundles of treated glass fibers between layers of the neoprene rubber constituting the continuous phase.

On cure and vulcanization of the resulting composite, a secure bond between the glass fiber bundles having the cellulose xanthate coating and the neoprene rubber is established. It is believed that the xanthate serves as a source of vulcanizing agent to further integrate the treated bundles with the elastomeric material.

EXAMPLE 6

Glass fibers treated in accordance with Example 2 are passed through a bath of dilute HCl (0.1 M) which serves to convert the cellulose xanthate coating to a cellulose coating and to gel the resorcinol formaldehyde latex impregnant.

The resulting bundle which is formed of a plurality of fibers containing an impregnant, and a cellulose coating on the bundle can be directly combined with elastomeric materials in the manufacture of glass fiber-reinforced elastomeric products, or subjected to further processing such as by treatment with conventional cellulose dip compositions prior to combination with elastomeric materials.

It will be understood that various changes and modifications can be made in the details of formulation, procedure and use without departing from the spirit of the invention, especially as defined in the following claims.

I claim:

1. In the method for the manufacture of glass fiber reinforced elastomeric products wherein bundles of glass fibers are combined with elastomeric materials constituting a continuous phase, the improvement in establishing a secure bonding relationship between the glass fibers and the elastomeric material constituting the continuous phase comprising the steps of impregnating a bundle of glass fibers with an alkaline impregnant containing an elastomer component and coating the resulting impregnated bundle with a metal cellulose xanthate to form a protective coating on the bundle to prevent the impregnant in the bundle from being dislodged therefrom.

2. A method as defined in claim 1 wherein the bundle of glass fibers is formed of a strand of a plurality of glass fiber filaments.

3. A method as defined in claim 1 wherein the bundle of glass fibers is formed of a plurality of strands of glass fibers which have been plied together.

4. A method as defined in claim 3 wherein the strands have been twisted and plied together.

5. A method as defined in claim 1 wherein the xanthate has the formula

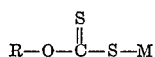

wherein R represents the cellulose group and M is a monovalent metal.

6. A method as defined in claim 1 which includes the steps of forming the coated and impregnated bundle into a fabric.

7. A method as defined in claim 6 which includes the step of passing the fabric through an alkaline bath to remove the cellulose xanthate coating.

8. A method as defined in claim 6 which includes the step of combining the fabric with an elastomeric material to form a glass fiber-elastomeric composite, and molding the composite under heat and pressure.

9. A method as defined in claim 1 which includes the step of contacting the coated and impregnated bundle with an organic halide of the formula $R_1$—X wherein $R_1$ is an organic group and X is a halogen atom.

10. A method as defined in claim 9 wherein $R_1$ is an acyl group.

11. A method as defined in claim 10 wherein $R_1$ is a group of the formula

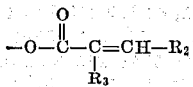

wherein $R_2$ is hydrogen or lower alkyl and $R_3$ is hydrogen or methyl.

12. A method as defined in claim 9 which includes the step of combining the coated and impregnated bundle with an elastomer after treatment with the organic halide to form a glass fiber-elastomer composite, and molding the composite under heat and pressure.

13. A method as defined in claim 1 which includes the step of contacting the coated and impregnated bundle with an acid to convert the cellulose xanthate coating to a cellulose coating.

14. A glass fiber bundle comprising a plurality of glass fibers, an impregnant in the bundle, said impregnant comprising an elastomer component and a thin coating on the surface of the bundle comprising a cellulose component to protect the impregnant from being dislodged from the bundle.

15. A bundle as defined in claim 14 wherein the cellulose component is a cellulose xanthate of the formula

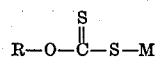

wherein R is the cellulose group and M is a monovalent metal.

16. A bundle as defined in claim 14 wherein the cellulose component is a cellulose xanthate derivative of the formula:

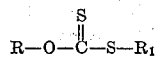

wherein R is a cellulose group and $R_1$ is a group capable of enhancing the bonding relation of the bundle with an elastomeric material.

17. A bundle as defined in claim 16 wherein $R_1$ is an acyl group.

18. A bundle as defined in claim 16 wherein $R_1$ is a group of the formula:

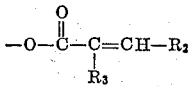

wherein $R_2$ is hydrogen or a lower alkyl group and $R_3$ is hydrogen or methyl.

19. A bundle as defined in claim 14 wherein the cellulose component is cellulose.

20. A bundle as defined in claim 14 wherein the impregnant includes an anchoring agent.

21. A bundle as defined in claim 14 wherein the bundle of glass fibers is formed of a strand of a plurality of glass fiber filaments.

22. A bundle as defined in claim 14 wherein the bundle of glass fibers is formed of a plurality of strands of glass fibers which have been plied together.

23. A bundle as defined in claim 22 wherein the strands have been twisted and plied together.

24. In a glass fiber-elastomeric product wherein an elastomeric material constitutes a continuous phase in bundles of glass fibers are distributed, the improvement in the bonding relationship between the glass fibers and the elastomeric material constituting the continuous phase comprising a glass fiber bundle as defined in claim 14.

25. In a glass fiber-elastomeric product wherein an elastomeric material constitutes a continuous phase in bundles of glass fibers are distributed, the improvement in the bonding relationship between the glass fibers and the elastomeric material constituting the continuous phase comprising a glass fiber bundle as defined in claim 15.

26. In a glass fiber-elastomeric product wherein an elastomeric material constitutes a continuous phase in bundles of glass fibers are distributed, the improvement in the bonding relationship between the glass fibers and the elastomeric material constituting the continuous phase comprising a glass fiber bundle as defined in claim 16.

References Cited
UNITED STATES PATENTS

| | | | |
|---|---|---|---|
| 3,391,052 | 7/1968 | Marzocchi | 161—176 |
| 3,707,399 | 12/1972 | Uffner | 161—176 X |

WILLIAM A. POWELL, Primary Examiner

U.S. Cl. X.R.

28—75; 57—140 C, 140 G, 149, 153, 162, 164; 117—126 GQ; 156—242; 161—93, 176; 264—135, 136